No. 831,433. PATENTED SEPT. 18, 1906.
M. HENDRICKSON.
CLUTCH MECHANISM.
APPLICATION FILED JULY 1, 1904.
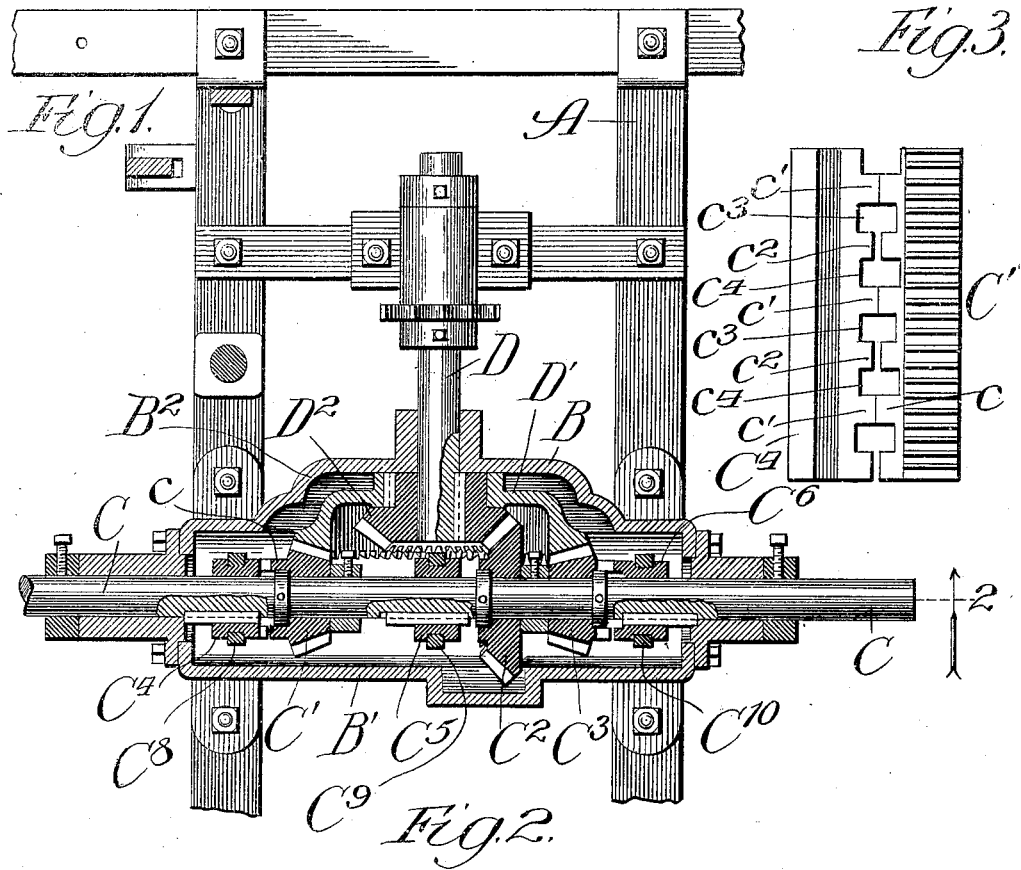
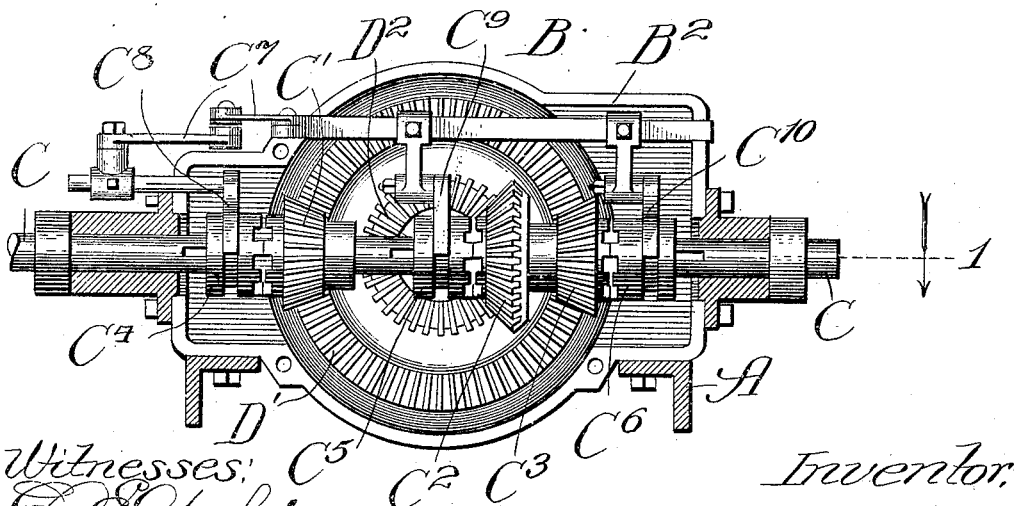

UNITED STATES PATENT OFFICE.

MAGNUS HENDRICKSON, OF CHICAGO, ILLINOIS, ASSIGNOR TO JACOB LAUTH, OF CHICAGO, ILLINOIS.

CLUTCH MECHANISM.

No. 831,433.     Specification of Letters Patent.     Patented Sept. 18, 1906.

Original application filed April 4, 1904, Serial No. 201,428. Divided and this application filed July 1, 1904. Serial No. 214,897.

*To all whom it may concern:*

Be it known that I, MAGNUS HENDRICKSON, a citizen of the United States, residing at 94 Rawson street, Chicago, in the county of Cook and State of Illinois, have invented a new and useful Improvement in Clutch Mechanism, of which the following is a specification.

The present application constitutes a division of application Serial No. 201,428, filed April 4, 1904, and relates particularly to the clutch device illustrated in connection with the power-transmission mechanism described in said application.

The primary object of this invention is to provide a positive clutch which may be thrown into engagement without difficulty during rotation of one of the clutch members, the construction being also adapted to prevent breakage of the clutch-teeth.

The invention is illustrated in the accompanying drawings, in which—

Figure 1 represents, by a broken plan section taken as indicated at line 1 of Fig. 2, a portion of power-transmission mechanism equipped with clutches involving my invention; Fig. 2, a vertical sectional view taken as indicated at line 2 of Fig. 1; and Fig. 3, a development of one of the gears and the attendant clutch members.

In the construction shown, A represents a frame, which may constitute a portion of the running-gears of a motor-vehicle; B, a gear-casing supported thereon and comprising sections $B'$ $B^2$; C, a driving-shaft supported in bearings at the ends of the casing B and having journaled thereon suitably-confined beveled gears $C'$ $C^2$ $C^3$, each equipped with a clutch member $c$; $C^4$ $C^5$ $C^6$, clutch members splined upon the shaft C and located, respectively, adjacent to the clutch members of the gears $C'$, $C^2$, and $C^3$; $C^7$, clutch-shifting means equipped with yokes $C^8$ $C^9$ $C^{10}$, engaging, respectively, the clutch members $C^4$ $C^5$ $C^6$; D, a shaft at right angles to the shaft C and journaled in a bearing with which the side $B^2$ of the casing is provided; $D'$, a relatively large bevel-gear fixed to rotate with the shaft D and engaging the gears $C'$ $C^3$; and $D^2$, a bevel-gear fixed to rotate with the shaft D and meshing with the gear $C^2$.

The improved clutch construction is shown in Fig. 3, where a development of the clutch member $C^4$ and the gear $C'$ and its attached clutch member $c$ are illustrated. The other clutch members are of the same construction. As shown, the clutch member $C^4$ has alternately long and short teeth $c'$ $c^2$, and it also has alternately deep and shallow recesses or spaces between teeth $c^3$ $c^4$. The clutch member $c$ is of similar construction.

It will now be understood that when the clutch member $C^4$ is shifted through the medium of its yoke to bring it into operative engagement with the clutch member $c$ of the gear $C'$ the clutch-teeth are caused to operate almost instantaneously, owing to the fact that by means of the alternately long and short tooth arrangement ample time is allowed to enable the teeth to interlock. This overcomes the great objection which has heretofore existed to the use of clutch members of the same general character, due to the slippage incident to an effort to cause the clutch-teeth to interlock. Moreover, the expedient provides against injury to the teeth, inasmuch as it provides for substantial engagement of the teeth at the moment when the first operative engagement occurs. The alternately deep and shallow arrangement of the sockets between the teeth provides for perfect interlocking when the clutch members are in engagement. The shiftable clutch members may be moved by any suitable means.

In the mechanism shown the shaft C may represent a shaft of the motor-vehicle which is driven by a motor at the front end of the vehicle, and the shaft D a transverse shaft actuated by the shaft C, the construction shown being capable of giving to the shaft D two speeds forward and one speed in a reverse direction.

What I regard as new, and desire to secure by Letters Patent, is—

1. A clutch comprising clutch members, each equipped with alternately long and short teeth, facilitating the engagement of the clutch members.

2. A clutch comprising clutch members, each equipped with alternately long and short teeth and with alternately deep and shallow recesses between teeth, facilitating the engagement and perfect interlocking of the clutch members, substantially as and for the purpose set forth.

3. A clutch comprising clutch members, each equipped with a plurality of long teeth, and short teeth located between the long teeth, whereby the engagement of the clutch members is facilitated and perfect interlocking accomplished.

4. A clutch comprising clutch members, each equipped with teeth of different length, and deep and shallow recesses between the teeth.

MAGNUS HENDRICKSON.

In presence of—
F. M. WIRTZ,
WALTER N. WINBERG.